United States Patent [19]

Soref

[11] Patent Number: 4,478,494

[45] Date of Patent: Oct. 23, 1984

[54] OPTICAL BYPASS SWITCH

[75] Inventor: Richard A. Soref, Newton Centre, Mass.

[73] Assignee: Sperry Corporation, New York, N.Y.

[21] Appl. No.: 322,820

[22] Filed: Nov. 19, 1981

[51] Int. Cl.³ .............................................. G02F 1/133
[52] U.S. Cl. ................... 350/381; 350/337; 350/347 E
[58] Field of Search ............... 350/355, 356, 381, 374, 350/380, 382, 331 R, 334, 337, 347 R, 347 E, 96.2

[56] References Cited

U.S. PATENT DOCUMENTS

| | | | |
|---|---|---|---|
| 4,011,543 | 3/1977 | Soref et al. | 350/96.13 |
| 4,201,442 | 5/1980 | McMahon et al. | 350/334 |
| 4,278,327 | 7/1981 | McMahon et al. | 350/334 |
| 4,385,799 | 5/1983 | Soref | 350/334 |

FOREIGN PATENT DOCUMENTS 0015139  9/1980  European Pat. Off. ............ 350/334

OTHER PUBLICATIONS

Wagner, R. E., et al., "Electrically Controlled Optical Switch for Multimode Fiber Applications", Applied Optics, vol. 19, No. 17, pp. 2921–2925.

Primary Examiner—Bruce Y. Arnold
Attorney, Agent, or Firm—Howard P. Terry; Seymour Levine

[57] ABSTRACT

The 2×2 bypass switch utilizes a single polarizing beam splitter and a 90° polarization twist layer of liquid crystal held between two right angle prisms. The outer surfaces of the prisms provide a series of total internal reflections to direct light about the switch so that a single polarizing beam splitter may be employed to divide an incident beam into two counter-rotating orthogonally polarized beams and to recombine the beam at the switch selective output port. A compound switch is realized by double folding the optical path in two parallel planes in one embodiment and along parallel paths in the incident plane in another embodiment.

8 Claims, 14 Drawing Figures

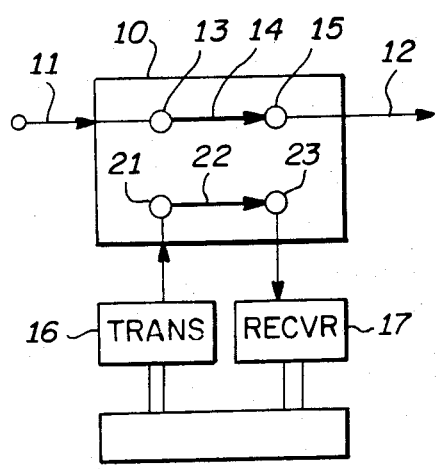
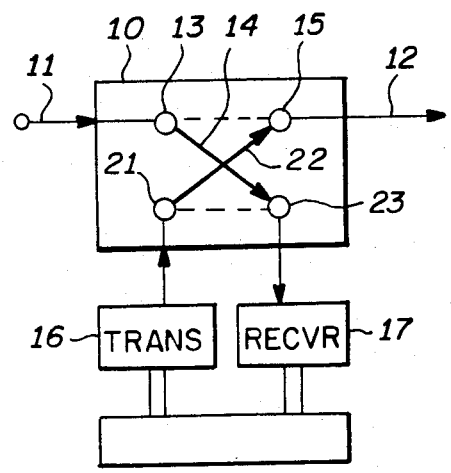
FIG.1A.  FIG.1B.
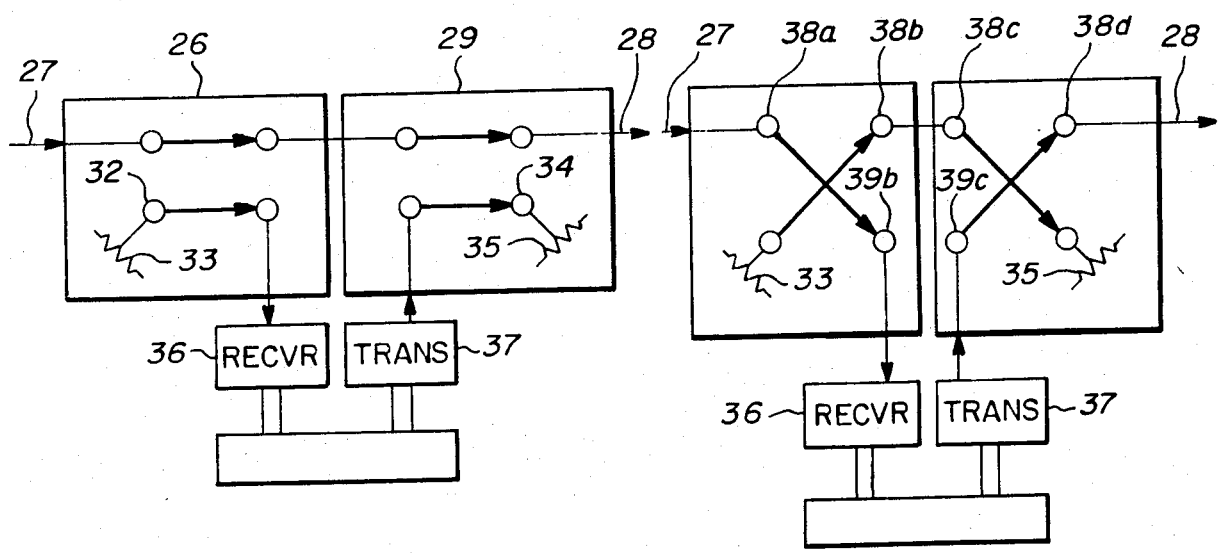
FIG.2A.  FIG.2B.

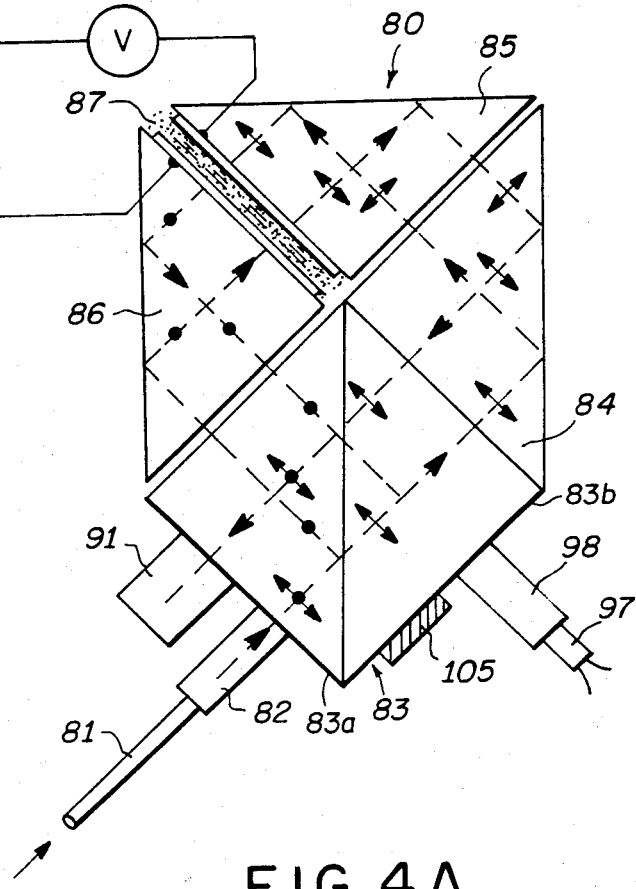
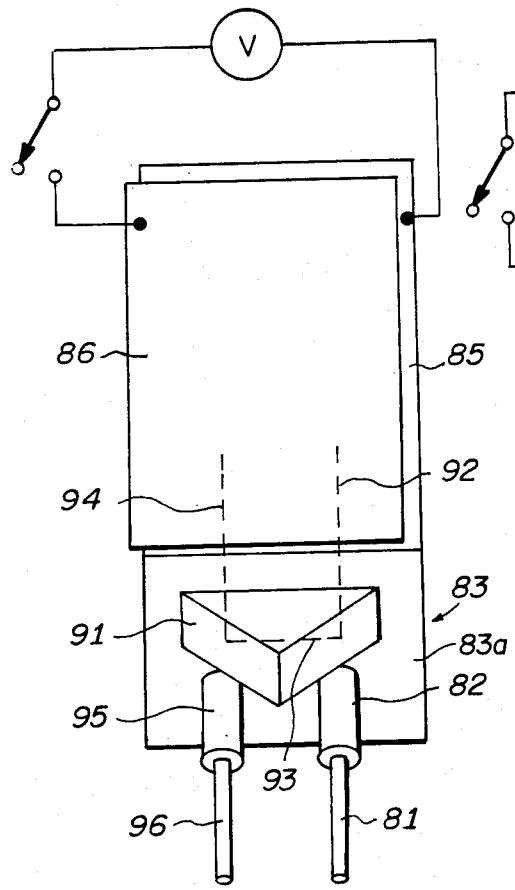
FIG. 4A.   FIG. 4B.
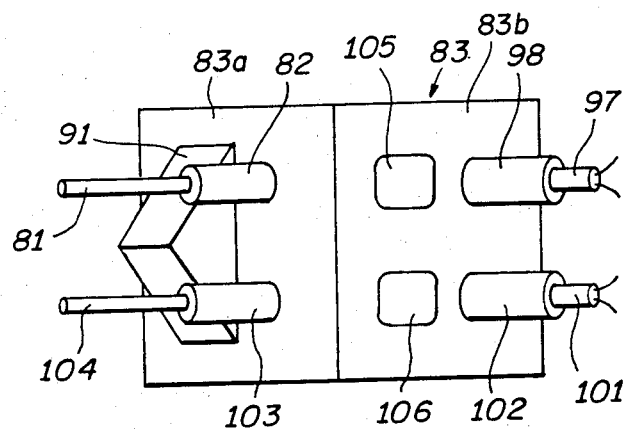
FIG. 4C.

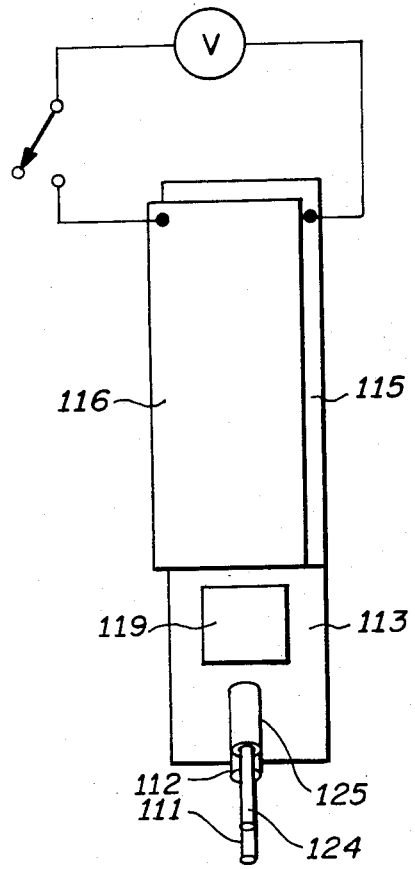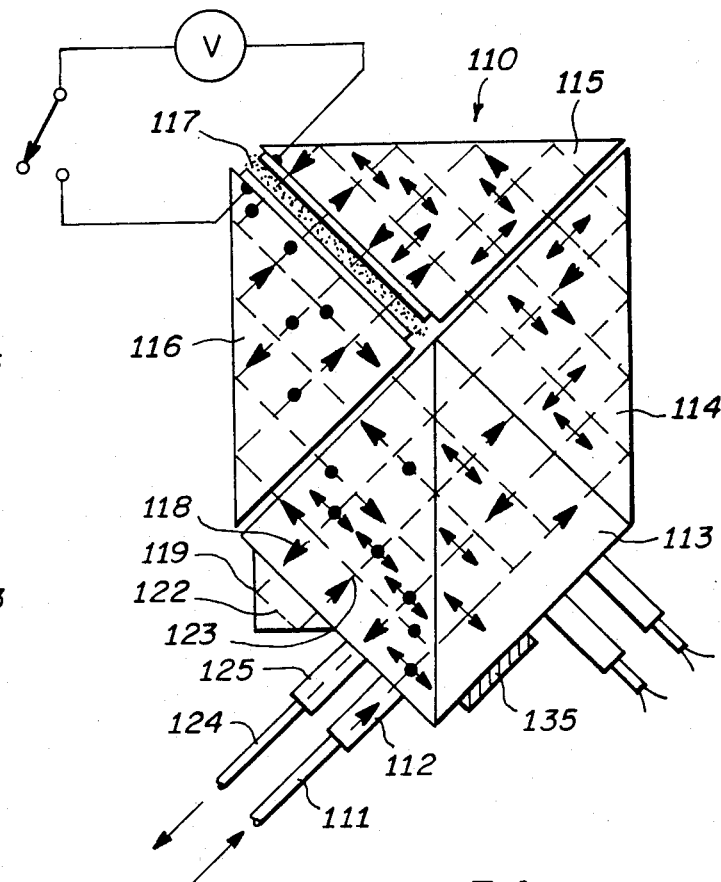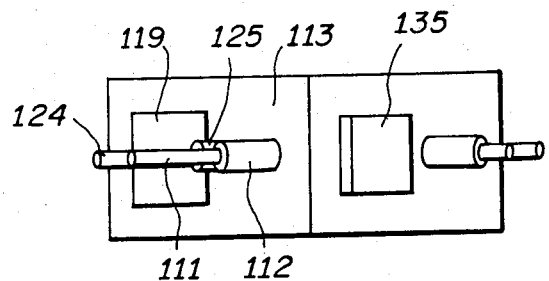
FIG.5B.
FIG.5A.
FIG.5C.

OPTICAL BYPASS SWITCH

BACKGROUND OF THE INVENTION

1. Field of the Invention

The invention pertains to electro-optic devices for switching unpolarized or polarized optical signals and more particularly to two-state optical switches which couple preselected pairs of terminals in each switch state.

2. Description of the Prior Art

Large information transmission capacity, immunity to electromagnetic interference, and freedom from ground loop problems ideally suit optical transmission systems for linking distributed computers and computer controlled industrial system components. These optical transmission systems utilize optical fibers to serially link a multiplicity of optical repeater stations. Power failure at one of the serially linked stations, however, may interrupt the data chain and cause the entire system to fail. To prevent such a catastrophe, a fail safe optical switch is employed at each repeater and component station which operates to bypass that station when local power is lost. These fail safe switches must possess low insertion loss properties, provide high isolation between the input and the output optical fibers during the "Power On" mode, and must function effectively with unpolarized light coupled thereto from a multi-mode fiber.

One switch design to accomplish this bypass function employs mirrors positioned on a metallic bar that is held in place between input and output optical fibers by an electromagnet. Light entering the input fiber is coupled to the station receiver by reflection from a mirror to an optical fiber coupled to the receiver+s detector. The optical signal from the station transmitter is coupled to an optical fiber wherefrom it illuminates a second mirror and deflected therefrom to an output fiber to propagate therealong to the next station. When the power fails, the electromagnet is deenergized and a spring, attached to the metallic bar, pulls the metal bar-mirror combination from the path between the input and output optical fibers, thus allowing light to be directly coupled therebetween. This system provides adequate switching performance, but does not possess the reliability inherent in an electro-optic switch. Electro-optic switches of the prior art, though possessing sufficiently low insertion losses, do not exhibit sufficiently high isolation between the input and output optical fibers during the energized switch mode. One such switch is described in the technical paper "Electrically Controlled Optical Switch for Multi-Mode Fiber Applications" by R. E. Wagner and J. Cheng, published in Applied Optics Sept. 1, 1980, Volume 19, Number 17. While this switch possesses sufficiently low insertion loss properties, it requires a plurality of costly polarizing beam splitters and extremely tight component tolerances to achieve crosstalk ratios in the energized state of $-20$ dB at best, a crosstalk level that is not sufficiently low to meet system requirements.

SUMMARY OF THE INVENTION

An optical bypass switch in accordance with the principles of the present invention includes a polarizing beam splitter with an optical fiber bus input and an optical fiber bus output in light exchanging relationships with a surface thereof, while a receiver optical fiber and transmitter optical fiber are in light exchanging relationships with a surface adjacent to the bus coupling surface. An optical signal incident to the beam splitter from the input optical fiber is split in accordance with the light polarization components to traverse two paths, a first component being deflected through a surface adjacent to the bus coupling surface and opposite the receiver-transmitter coupling surface, while a second polarization component, normal to the first, propagates through the beam splitter to the surface opposite the bus coupling surface and adjacent the receiver-transmitter coupling surface. The light in the first polarization state is deflected by a prism or mirror to a 90° twisted nematic liquid crystal layer which, with no voltage applied across the surfaces thereof, rotates the polarization through 90° such that the emerging light beam is polarized in the second polarization state. This beam is deflected by a combination of prisms or mirrors to be incident to the surface of the beam splitter opposite the bus coupling surface and propagates therethrough undeflected to couple to the optical fiber output bus.

The light in the second polarization state, incident to the beam splitter from the fiber optics input bus, propagates through the beam splitter undeflected to emerge from the surface opposite the bus coupling surface and is deflected by a combination of prisms or mirrors to the liquid crystal layer. Since no voltage is applied across the surfaces of the liquid crystal, the beam experiences a 90° twist in polarization and emerges therefrom in the first polarization state. This beam is deflected by the prism or mirror to the surface of the beam splitter opposite the receiver-transmitter surface and is deflected by the beam splitter to couple to the optical fiber output bus. Thus, when no voltage is applied across the surfaces of the nematic liquid crystal layer, an optical signal on the input bus bypasses the repeater and is directly coupled to the output bus.

When a voltage is applied across the surfaces of the liquid crystal the polarized beams propagate therethrough without a polarization rotation. Components in the first polarization state of light initially incident to the bus coupling surface of the beam splitter emerging from the liquid crystal are deflected to the beam splitter and further deflected therein to be incident to the receiver-transmitter surface, while components in the second polarization state of light initially incident to the bus coupling surface emerging from the liquid crystal are deflected to the beam splitter and propagate therethrough undeflected also to be incident to the transmitter-receiver surface.

Since the device is reciprocal, a similar transfer occurs for light incident to the transmitter-receiver surface. The optical paths and the coupling ports are arranged such that a voltage applied to the liquid crystal causes light incident to the switch from the input optical fiber to be coupled to the receiver and light from the transmitter to be coupled to the output optical fiber.

In a second embodiment of the invention, improved isolation between the input and output optical fibers is achieved by positioning a deflecting component on the input-output surface at the location of the output optical fiber to deflect the light emerging therefrom from the initial plane of incidence to a second plane of incidence parallel to the first. The light rays in the second plane of incidence traverse paths parallel to the initial paths, retracing the route through the switch to emerge at an output optical fiber positioned in the second plane of incidence at a position therein corresponding to the position of the input optical fiber in the first plane of incidence.

In a third embodiment of the invention, greater isolation is achieved between the input and output optical fibers than that achieved by the first embodiment by positioning a reflecting component at the location of the output optical fiber in the first embodiment. This component deflects the emerging light to traverse another path in the initial plane of incidence that is parallel to the initial path. The deflected light is thereby coupled to an output optical fiber displaced in the initial plane of incidence from the deflecting component.

BRIEF DESCRIPTION OF THE DRAWINGS

FIGS. 1A and 1B are schematic diagrams of the "OFF" and "ON" states respectively of a 2×2 switch.

FIGS. 2A and 2B are schematic diagrams of the "OFF" and "ON" states of a compound 2×2 switch.

FIG. 4A is a side view of a second embodiment of the invention with propagation paths superposed thereon which are useful for explaining switching operations.

FIGS. 4B and 4C are front and bottom views respectively of the second embodiment of the invention.

FIG. 5A is a side view of a third embodiment of the invention with propagation paths superposed thereon which are useful for explaining switching operations.

FIGS. 5B and 5C are front and bottom views respectively of the third embodiment of the invention.

DESCRIPTION OF THE PREFERRED EMBODIMENTS

Figure 3A:
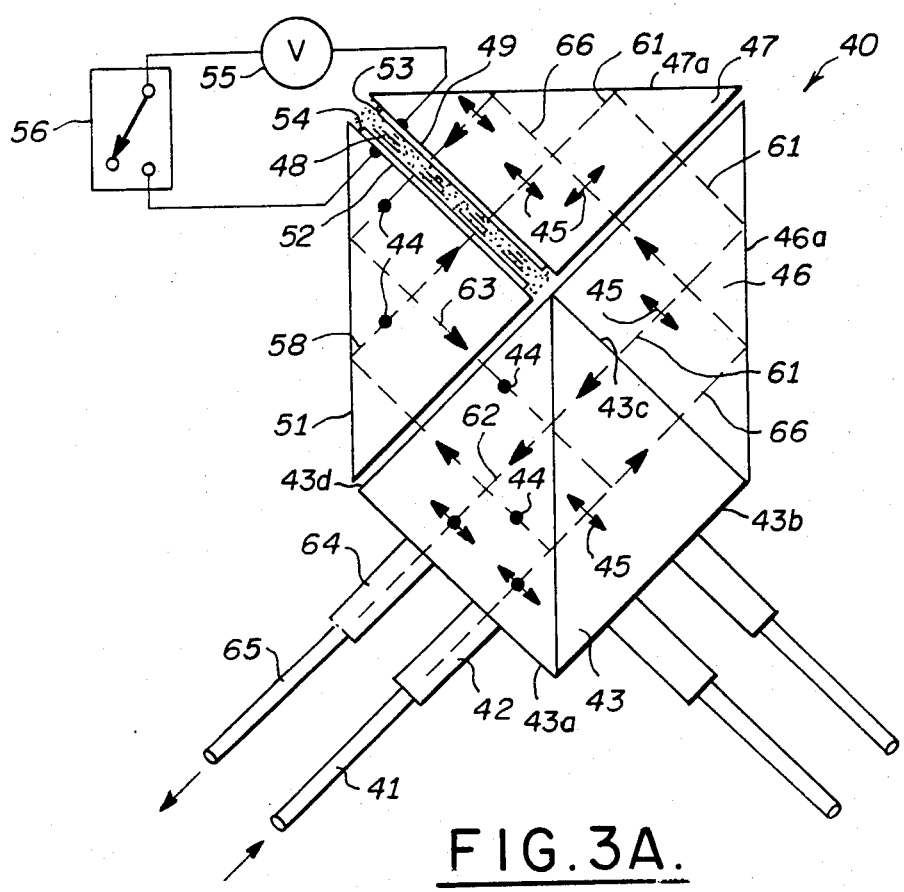
FIGS. 3A and 3B are side views of an embodiment of the invention with propagation paths indicated thereon which are useful for explaining switching operation.

A switch for bypassing a station, in a series of optically linked stations, when a power failure occurs threat basically possesses two states, only one which need possess low crosstalk (high optical isolation) characteristics. Bypassing may be accomplished with a conventional 2×2 switch as illustrated in FIGS. 1A and 1B. In the bypass state, shown schematically in FIG. 1A, optical signals incident to the switch 10 from an input optical fiber 11 are coupled to an output optical fiber 12 via terminal 13, wiper arm 14 and terminal 15. In this state the station transmitter 16 is directly coupled to the station receiver 17 via terminal 21 wiper arm 22 and terminal 23. Since the switch 10 is operated in the bypass mode when repeater operation at the station is not required or receiver and transmitter operation is impeded by a power failure, high isolation between terminals 13, 21 and terminals 15, 23 is not required. Isolation between these terminals need only be sufficient to prevent significant through put loss between the input optical fiber 11 and the output optical fiber 12. In FIG. 1B, the switch 10 is shown in the "ON" state whereby input fiber 11 is coupled via terminal 13, wiper arm 14 and terminal 23 to the receiver 17 and the output of the transmitter 16 is coupled via terminal 21, wiper arm 22 and terminal 15 to the output optical fiber 12. High isolation between terminals 21 and 23, to prevent feedback from the transmitter 16 to the receiver 17, and between terminals 13 and 15, to prevent the input optical signals from optical fiber 11 from interfering with the optical signal coupled to the output optical fiber 12 from the transmitter 16, is required for this state. Let us denote $C_{BB}$, as the forward optical crosstalk in the ON state from the bus fiber 11 to the bus fiber 12. Also, $C_{TR}$ denotes the reverse optical crosstalk from transmitter to receiver in the ON state. An analysis of optical data bus systems with the serial topology shows that the crosstalk of the bypass switch must be less than $-30$ dB in both propagation directions; that is, we require $C_{BB} \leq -30$ dB and $C_{TR} \leq -30$ dB.

In U.S. Pat. No. 4,011,543 entitled "Low Crosstalk Optical Switch", issued to Soref et al in February 1976 and assigned to the assignee of the present invention, it is shown that crosstalk can be significantly reduced by compounding two switches. An arrangement of 2×2 compounded switches that may be employed for bypass operation is drawn schematically in FIGS. 2A and 2B. During the "OFF" state an optical signal from input optical fiber 27 is coupled to output optical fiber 28 via switches 26 and 29. On terminal 32 of switch 26 is terminated with an optical absorber 33 and one terminal 34 of switch 29 is terminated with an optical absorber 35. Thus, in the "OFF" state receiver 36 and transmitter 37 are respectively coupled to optical absorbers 33 and 35. During the "ON" state, the input optical fiber 27 is coupled to the receiver 36 and the transmitter 37 is coupled to the output optical fiber 28 as shown in FIG. 2B. A fractional optical crosstalk of $\delta$ between the terminals 38a, 38b, and 38c, 38d, and an optical crosstalk of $\beta$ between terminals 38b, 39b, and 38c, 39c for the switch state of FIG. 2B, transforms for this tandem switch coupling to an optical crosstalk of $\delta^2$ between terminals 38a, 38d and $\beta^2$ between terminals 39c, 39b. In other words, two-stage switch provides twice the optical isolation in dB of the single-stage switch.

Refer now to FIG. 3A wherein an electro-optic switch 40 incorporating the principles of the invention is shown. An optical signal propagating within an input optical fiber 41 is coupled through a collimating GRIN-rod lens 42 to be incident to a polarizing beam splitter 43 at a first surface 43a. The optical fiber 41 and the GRIN rod lens 42 defining an input port. The incident light, which may be unpolarized, is split by the polarizing beam splitter 43 into two beams with orthogonal linear polarization represented by the darker circles 44 and two directional arrows 45 respectively. One polarization, as for example that represented by the two directional arrows 45, continues to propagate along paths substantially collinear with the incident path and is coupled through surface 43c for propagation in a series of reflecting prisms 46 and 47 to propagate through surface 49 of prism 47 to be substantially normally incident to an initially twisted nematic liquid crystal layer 48. The other polarization, that represented by the darkened circles 44, is deflected by the beam splitter 43 to propagate along the paths substantially perpendicular to the incident path and is coupled through surface 43a, to a deflecting prism 51 to be incident to the liquid crystal 48 through the surface 52 of the prism 51. The surfaces 49 and 52 which interface with the liquid crystal layer 48 are coated with thin, optically transparent, electrically conducting layers 53, 54 preferably of indiumtin oxide (ITO) in thicknesses of 500 to 1000 Angstroms and a surface alignment film such as SiO. The conducting layers 53, 54 are the surfaces that enclose the liquid crystal 48, the combination comprising a polarization twist element. A voltage source 55 and a switch 56 are coupled in a series relationship with the ITO electrodes 53,54. To assure a long lifetime of operation for the liquid crystal, the source is a.c. rather than d.c. This source may be a square wave or sine wave voltage with a frequency between 500 and 2000 Hz. With switch 56 in the open condition, as shown in FIG. 3A, the liquid crystal layer 48 twists the polarization of light passing therethrough through a 90° angle, causing the polarization of the signal coupled from the prism 47 through the liquid crystal layer 48 to the prism 51 to rotate from that represented by the double arrow 45 to the orthogonal polarization thereof represented by the darkened circles 44. Similarly, the polarization of the signals coupled from the prism 51 through the liquid crystal layer 48 to the prism 47 are rotated from the polarization represented by the darkened circles 44 to the orthogonal polarization thereof represented by the double arrows 45. Signals coupled to prism 47 from path 58 in prism 51 are deflected by prisms 47, 46 along the path 61 to be incident to polarizing beam splitter 43 with a polarization that permits propagation through the beam splitter 43 along the path 62 that is substantially collinear with the path 61. In a comparable manner, a signal coupled to prism 51 through the liquid crystal layer 48 from a path 66 in prism 47 is deflected along the path 63 to be incident to polarizing beam splitter 43 (a second conjugate location on the multilayer dielectric film on the hypotenuse of cube 43) with a polarization that deflects the signal from the path 63 to the substantially perpendicular path 62. Thus, the two orthogonal linear polarized beams, split from the unpolarized beam coupled from the input fiber 41, are recombined by the polarizing beam splitter 43 to form an unpolarized beam propagating along the path 62. In the manner described above, optical signals bypass the repeater station when a power cutoff causes the electrical switch 56 to open.

Figure 3B:
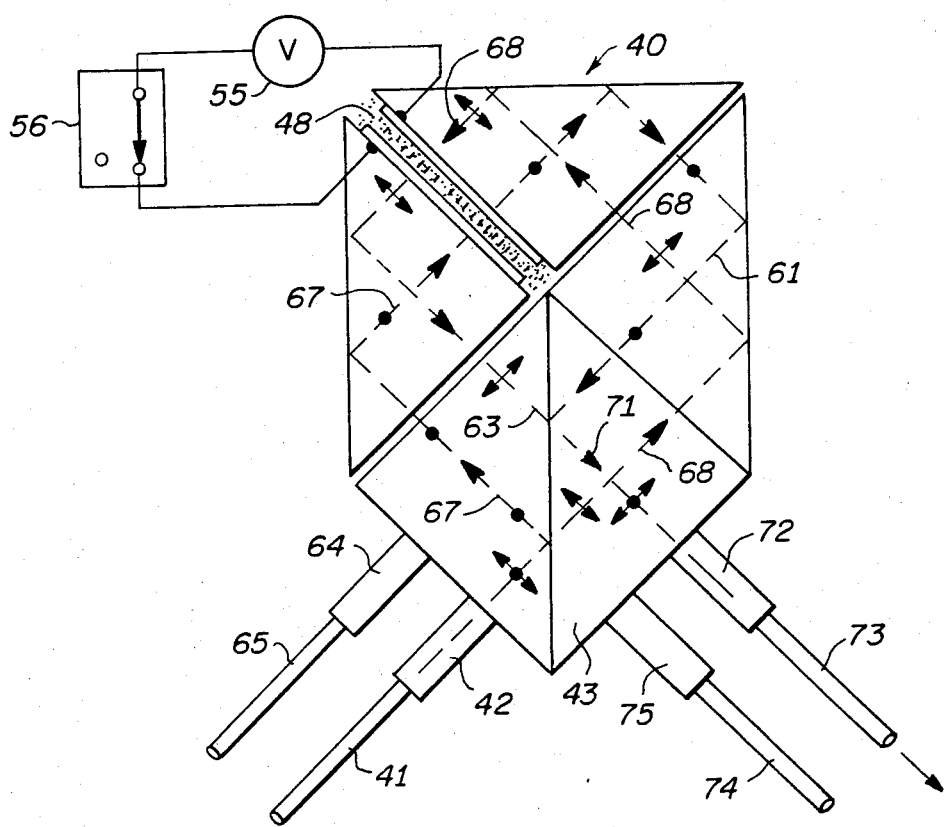

In FIG. 3B switch 56 is closed, indicating power "ON" condition at the repeater station. This condition couples a voltage of 3 to 5 $V_{rms}$ from the voltage generator 55 across the liquid crystal layer 48, causing a realignment of molecules within the liquid crystal 48 to positions that permit optical signals to propagate therethrough without polarization rotations. The signals now incident to the polarization beam splitter 43 from the input optical bus fiber 41 and GRINrod lens 42 are split into two beams with orthogonal linear polarizations as previously described to propagate along paths 67, 68 and are incident to the opposite surfaces of the liquid crystal layer 48. These signals are now coupled across the liquid crystal layers to propagate along the paths 61,63 without polarization rotation. The signal incident to beam splitter 43 along path 63 propagates therethrough along a substantially collinear path 71, while the signal incident to the beam splitter 43 from path 61 is deflected therein to also propagate along the path 71. The two orthogonal polarized beams have now been combined to form an unpolarized beam which is coupled through surface 43b and a GRINrod lens 72 to an optical fiber 73 for coupling to an optical receiver. In like manner, a beam from the repeater station transmitter is coupled via optical fiber 74 and collimating GRINrod lens 75 to the switch 40 wherein it is divided by the polarization beam splitter 43, routed from one surface thereof through the energized liquid crystal layer 48 via prisms 46, 47, and therefrom, via prism 51, to another surface of the polarization beam splitter 43 wherein it is recombined to form an unpolarized beam that is coupled by a GRINrod lens 64 to the output optical bus fiber 65.

Though the switch 40, described above, may be utilized as a bypass switch, for many applications, the isolation between input-output fibers and between transmitter-receiver ports is insufficient. As stated above, the isolation may be increased by compounding two switches and thereby one can obtain −30 dB crosstalk or better. For purposes of economy it is desired to accomplish this compounding without additional components. This may be realized by relocating the output and transmitter coupling optical fibers to a plane that is parallel to the plane of incidence and positioning a deflector and an optical absorber respectively at the original locations. A compound switch constructed in this manner is shown in FIGS. 4A, 4B, 4C, which are side, front and bottom views of the switch respectively. When the switch 80 is in the "OFF" state, an unpolarized beam incident from the input optical fiber 81 is coupled through a GRINrod collimating lens 82 to be incident to a polarizing beam splitter 83 through surface 83a, as a collimated unpolarized beam. This collimated unpolarized beam is divided by the polarization beam splitter 83 into two substantially orthogonal linear polarized beams which are routed through deflectors 84,85,86, and a liquid crystal layer 87 as previously described, to be incident to deflector 91 (a right angle prism). Deflector 91 deflects an unpolarized beam emerging from the polarizing beam splitter 83 from the propagating plane 92 shown in FIG. 4 via the path 93 to be reincident to the polarizing beam splitter 83 in a plane 94 adjacent and parallel to the plane 22. The reincident beam is divided into two substantially orthogonal linear polarized beams in polarization beam splitter 83 which propagate through the system of deflectors 84, 85, 86, and liquid crystal layer 87 in the plane 94 as the beam propagation in the plane 92 previously described. The reincident beam is coupled from the polarization beam splitter 83, through surface 43a, to the combination GRINrod lens 95 and optical fiber 96 which is aligned with the plane 94.

Figure 4D:
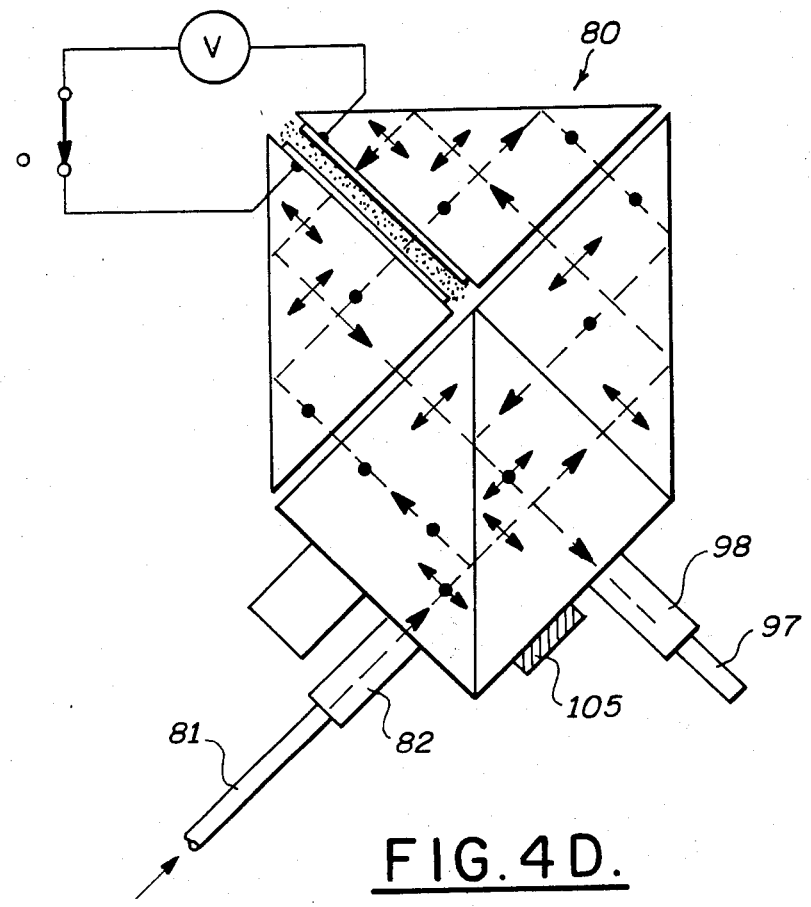
FIG. 4D is a side view of the second embodiment of the invention wherein propagation paths for the switch "ON" states are shown.

When the switch 80 is in the "ON" state, as shown in FIG. 4D, the two beams formed from the light incident, from the optical fiber 81 and a GRINrod lens 82, to the polarizing beam splitter 83 propagate in the plane of incidence through the deflectors 84, 85, 86, and liquid crystal layer 87, as previously described, to establish an unpolarized beam that is coupled, through surface 83b, to the combination of receiving optical fiber 97 and GRINrod lens 98 positioned in alignment with the plane of incidence. In a similar manner, light coupled through transmitting optical fiber 101 via GRINrod lens 102, shown in FIG. 4C, is processed in the plane adjacent and parallel to the incident plane to couple to the combination of GRINrod lens 103 and output optical fiber 104 that is aligned with this parallel-adjacent plane. An optical absorber 105 is positioned in alignment with the incident plane at a location corresponding to the output port of a 2×2 switch to absorb stray light coupled thereto from either the optical fiber GRINrod lens combination 81, 82 or optical fiber GRINrod lens combination 97,98. Similarly, optical absorber 106 is positioned in alignment with the parallel-adjacent plane at a position corresponding to the transmitter port to absorb light coupled thereto from the optical fiber GRINrod lens combination 104,103 and from the optical fiber GRINrod lens combination 101,102.

In FIGS. 5A, 5B, and 5C a tandem switch 110 of two 2×2 switches formed by causing a beam to traverse the combination of polarizing beam splitter, reflectors and liquid crystal layer twice in a single plane is shown in the "OFF" state. The beam incident to the switch 110 from the optical fiber 111 via collimating GRINrod lens 112 is divided by the polarizing beam splitter 113, as previously discussed and the two substantially orthogonally polarized beams propagate through a combination of deflectors 114, 115, 116, and liquid crystal layer 117 to couple an unpolarized beam on the path 118 to a deflector 119 positioned at a port location for the first of the tandem switches. This unpolarized beam is routed through a deflector 119 (a right angle prism giving two internal reflections) via path 122 to be incident to the polarizing beam splitter 113 and traverse a path 123 therein that is adjacent and parallel to the path 118. The reincident unpolarized beam 123 is divided in polarizing beam splitter 113 and processed in a manner similar to that of the originally incident beam and emerges from the beam splitter 113 to couple to optical fiber 124 via GRINrod lens 125.

Figure 5D:
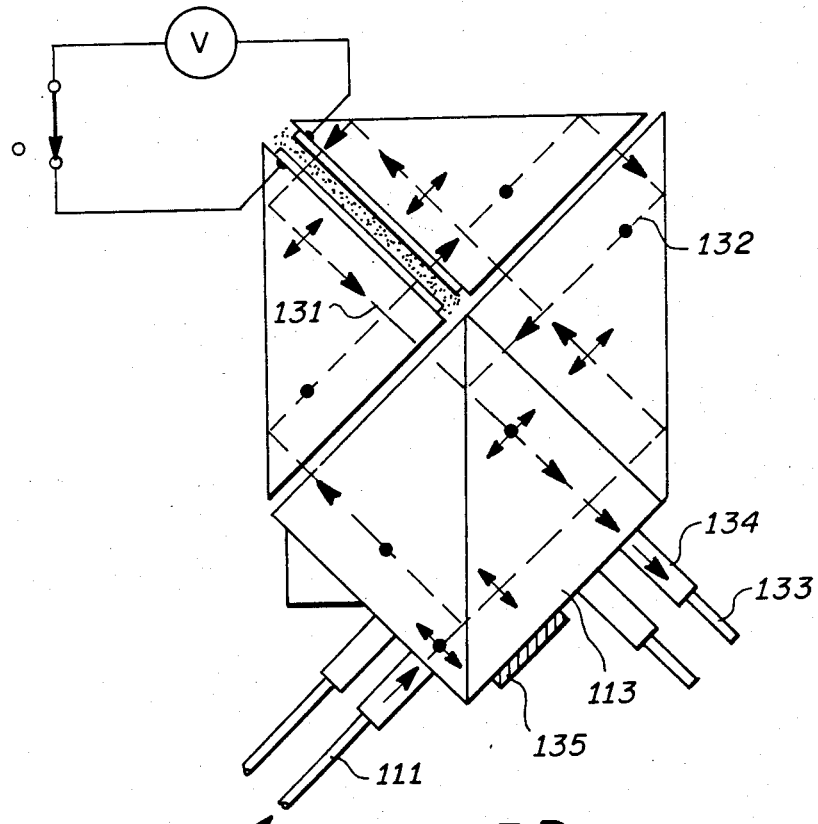
FIG. 5D is a side view of the third embodiment of the invention wherein propagtion paths for the switch "ON" state are shown.

In FIG. 5D are shown optical paths for the "ON" state of the tandem switch 110. The two beams split from the beam incident to optical fiber 111, emerge from the beam splitter 113 along paths 131 and 132 and are routed as previously described through liquid crystal layer 117. Since this layer is in the energized state, the beams propagate therethrough without polarization rotation, and are routed through the system to couple to an optical fiber 133 via GRINrod lens 134. The compound switch is completed by positioning optical absorbers 135 at the unused port locations of each sub-switch that comprises the compound bypass switch.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. An apparatus with first, second, third and fourth ports positioned in substantial alignment with a first plane and having a first state wherein arbitrarily polarized light resolvable into first and second linear polarization components incident to the first port is coupled to the second port and such light incident to the third port is coupled to the fourth port and a second state wherein the arbitrarily polarized light incident to the first port is coupled to the fourth port and such light incident to the third port is coupled to the second port comprising:

beam splitter means having a first surface in light exchanging relationship with said first and fourth ports and a second surface in light exchanging relationship with said second and third ports for coupling light components at said first linear polarization between said first surface and a third surface thereof and light components at said second linear polarization between said first surface and a fourth surface thereof;

means for applying a first voltage and a second voltage corresponding respectively to said first and second states;

polarization twist means having first and second surfaces coupled to said voltage applying means for rotating light polarization through a first angle when said first voltage is applied across said first and second surfaces and through a second angle when said second voltage is applied across said first and second surfaces; and first deflection means for deflecting light in said first plane between said third surface of said beam splitting means and said first surface of said polarization twist means and between said second surface of said polarization twist means and said fourth surface of said beam splitting means whereby signals incident to said first port are coupled through said apparatus to said second port and signals incident to said third port are coupled through said apparatus to said fourth port when said first voltage is applied across said first and second surfaces of said polarization twist means and signals incident to said first port are coupled through said apparatus to said fourth port and signals incident to said third port are coupled to said second port when said second voltage is applied across said first and second surfaces to said polarization twist means.

2. An apparatus in accordance with claim 1 wherein said first, second, third, and fourth ports are substantially coplanar in a plane through said apparatus.

3. An apparatus in accordance with claim 2 further including:

second deflection means positioned substantially at said fourth port location in said first plane for deflecting light to a second plane through said apparatus that is parallel and adjacent to said first plane;

a fifth port in light exchanging relationship with said first surface of said beam splitting means substantially in alignment with said second plane at location therein that is in substantial alignment with said first port location in said first plane; and a sixth port in light exchanging relationship with said second surface of said beam splitting means substantially in alignment with said second plane at a location therein that is in substantial alignment with said second port location in said first plane whereby, with said apparatus in said first state, light incident thereto from said first port is coupled to said second port and light incident to said apparatus from said sixth port is coupled to said fifth port and with said apparatus in said second state light incident thereto from said first port is coupled to said fifth port and light incident to said sixth port is coupled to said second port.

4. An apparatus in accordance with claim 2 further including:

second deflection means positioned in substantial alignment with said first plane for deflecting light emerging from said fourth port along a path in said first plane that is adjacent and substantially parallel to light paths incident to said fourth port; and a fifth port positioned in substantial alignment with said first plane adjacent said first port;

whereby with said apparatus in said first state, signals incident thereto from said first port couple therethrough to said second port, and with said apparatus in said second state, signals incident to said first port couple to said fifth port.

5. An apparatus in accordance with claim 4 further including light absorbing means positioned in substantial alignment with said first plane substantially at said third port for absorbing light emitted from said third port.

6. An apparatus in accordance with claims 1, 2, 3, 4, or 5 wherein said first deflection means comprises:
   first and second right angle prisms positioned between said fourth surface of said polarizing beam splitter, means and said second surface of said polarization twist means each having an internally reflecting hypotenuse plane forming a portion of an outer surface of said apparatus; and
   a third right angle prism coupled between said third surface of said polarizing beam splitter means and said first surface of said polarization twist means having an internally reflecting hypotenuse plane forming portion of an outer surface of said apparatus, said outer surface comprising said hypotenuse planes of said first, second, and third prisms and said first and second surfaces of said polarizing beam splitter means.

7. An apparatus in accordance with claims 1, 2, 3, 4, or 5 wherein said polarization twist means includes a liquid crystal layer between said first and second surfaces thereof.

8. An apparatus in accordance with claim 3 further including light absorbing means positoned on said second surface of said beam splitting means in substantial alignment with said first and second planes at locations therein corresponding to said third port location in said first plane for absorbing light emitted at said locations.

* * * * *